United States Patent
Park et al.

(10) Patent No.: US 7,171,891 B2
(45) Date of Patent: Feb. 6, 2007

(54) BREAD MAKER

(75) Inventors: Jae-ryong Park, Suwon (KR); Yong-hyun Kwon, Suwon (KR); Chul Kim, Anyang (KR); Tae-uk Lee, Suwon (KR); Han-jun Sung, Suwon (KR); Jang-woo Lee, Suwon (KR); Dong-bin Lim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 338 days.

(21) Appl. No.: 10/776,234

(22) Filed: Feb. 12, 2004

(65) Prior Publication Data
US 2004/0221728 A1    Nov. 11, 2004

(30) Foreign Application Priority Data
May 7, 2003    (KR)    ................ 10-2003-0028912

(51) Int. Cl.
*A21B 1/00*    (2006.01)
*A47J 37/00*    (2006.01)

(52) U.S. Cl. .................... 99/348; 99/467; 99/353; 126/275 E

(58) Field of Classification Search .............. 99/348, 99/353, 328, 426, 326, 467; 366/149, 146, 366/219, 349, 240
See application file for complete search history.

(56) References Cited

U.S. PATENT DOCUMENTS

| | | | |
|---|---|---|---|
| 1,850,450 A | * | 3/1932 | Denmire ................. 366/73 |
| 2,784,683 A | * | 3/1957 | Curtis et al. ............... 425/168 |
| 4,590,850 A | * | 5/1986 | Hedenberg ................ 99/348 |
| 4,803,086 A | | 2/1989 | Hedenberg |
| 5,146,840 A | * | 9/1992 | Hedenberg ................ 99/328 |
| 5,266,856 A | | 11/1993 | Holter |
| 5,947,009 A | | 9/1999 | Hedenberg |
| 6,031,714 A | | 2/2000 | Ma |

FOREIGN PATENT DOCUMENTS

| | | |
|---|---|---|
| JP | 2001-523444 | 11/2001 |
| KR | 91-10203 | 12/1991 |
| KR | 2000-207262 | 12/2000 |
| WO | WO 92/10100 | 6/1992 |

OTHER PUBLICATIONS

SIPO Office Action for App. No. 200310118633.4 dated Aug. 19, 2005.
Japanese Office Action for Application No. 2004-101348 issued Dec. 13, 2005.

* cited by examiner

*Primary Examiner*—Reginald L. Alexander
(74) *Attorney, Agent, or Firm*—Staas & Halsey LLP

(57) ABSTRACT

A bread maker, having: a main body defining an oven compartment; a pair of kneading drums rotatably provided inside the oven compartment, spaced apart from each other, each kneading drum holding opposite ends of a mixing bag and being rotated; a pair of kneading members oppositely provided between the pair of kneading drums, spaced apart and defining a slit therebetween to allow the mixing bag to pass therethrough; and a slit adjusting part adjusting the pair kneading members to adjust the slit.

20 Claims, 3 Drawing Sheets

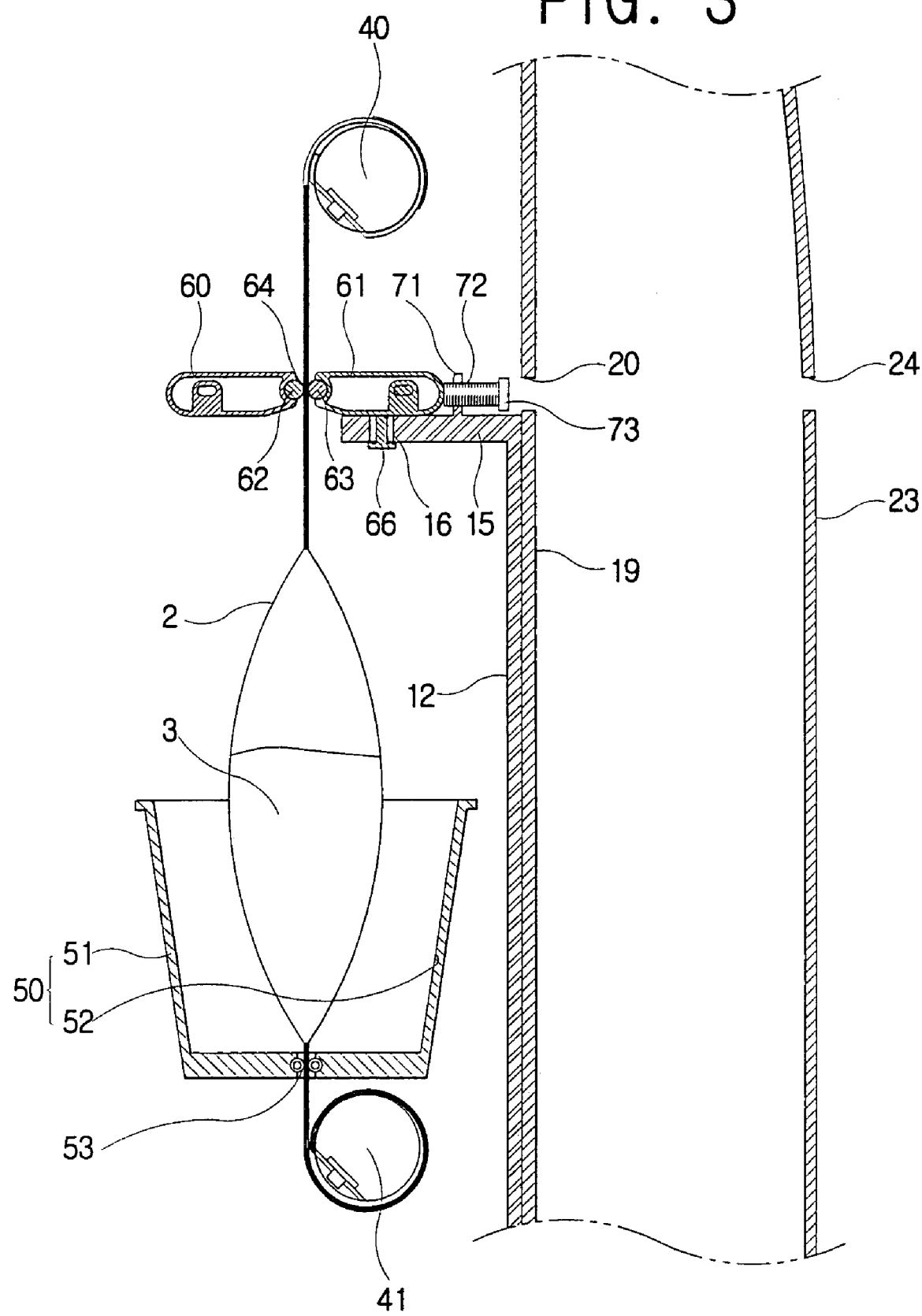

BREAD MAKER

CROSS-REFERENCE TO RELATED APPLICATIONS

This application claims the benefit of Korean Application No. 2003-28912, filed May 7, 2003, in the Korean Intellectual Property Office, the disclosure of which is incorporated herein by reference.

BACKGROUND OF THE INVENTION

1. Field of the Invention

The present invention relates to a bread maker, and more particularly, to a bread maker having a main body defining an oven compartment, and a pair of kneading drums spaced apart from each other inside the oven compartment, rotating in clockwise and counterclockwise directions, and having a holding part holding opposite ends of a mixing bag filled with dough.

2. Description of the Related Art

Conventionally, various bread makers have been developed to allow a user to make bread automatically. For example, there is a conventional bread maker comprising: a pair of kneading drums provided in upper and lower sides of an oven compartment and opposite ends of a mixing bag filled with raw materials for making bread to be wound thereon; and a pair of kneading members oppositely provided between the pair of kneading drums and allowing the raw materials in the mixing bag to be kneaded, and preventing the kneaded raw materials from being slipped out toward an upper side of an upper kneading drum. The pair of kneading members are provided oppositely, forming a slit through which the mixing bag passes.

With the above configuration, once the bread maker is operated, both kneading drums rotate clockwise and counterclockwise by a driving part, such as a motor, which makes the mixing bag move up and down. In this process, the mixing bag passes through the slit formed between both kneading members, thereby, kneading the raw materials.

In the conventional bread maker having the above configuration, a gap of the slit formed between both kneading members is fixed. Accordingly, if the gap of the slit does not meet a desired size owing to manufacturing errors, the raw materials are not uniformly kneaded during the bread making process, and an operation error of the bread maker may be generated. For example, if the gap between both kneading members is greater than a predetermined size, a portion of the raw materials filled in the mixing bag may pass through the slit with the mixing bag and move toward the upper kneading drum, which prevents the raw materials from being smoothly kneaded. Conversely, if the gap of between both kneading members is less than a predetermined size, the mixing bag may not move up and down, and may become jammed in the slit. And, if both kneading drums are rotated with the mixing bag jammed in the slit, the mixing bag may be torn.

SUMMARY OF THE INVENTION

It is an aspect of the present invention to provide a bread maker providing a smooth kneading operation by adjusting a slit between opposing kneading members.

Additional aspects and advantages of the invention will be set forth in part in the description that follows, and, in part, will be obvious from the description, or may be learned by practice of the invention.

To achieve the above and/or other aspects according to the present invention, there is provided a bread maker, comprising: a main body defining an oven compartment; a pair of kneading drums rotatably provided inside the oven compartment, spaced apart from each other, each kneading drum holding opposite ends of a mixing bag and being rotated; a pair of kneading members oppositely provided between the pair of kneading drums, spaced apart and defining a slit therebetween to allow the mixing bag to pass therethrough; and a slit adjusting part adjusting the pair of kneading members to adjust the slit.

According to an aspect, the pair of kneading members comprise a rotatable kneading member rotatably provided in the oven compartment; and an adjustable kneading member provided to approach and retreat from the rotatable kneading member by operation of the slit adjusting part.

According to an aspect, the bread maker further comprises a support bracket protruded in a first direction from an inside wall of the oven compartment, and supporting the adjustable kneading member, wherein the slit adjusting part comprises adjusting screw supporter protruded from the supporting bracket and having an adjusting screw hole, and an adjusting screw engaged to the adjusting screw hole and causing the adjustable kneading member to approach and retreat from the rotatable kneading member.

According to an aspect, in one of the adjustable kneading member and the support bracket, there is provided a guide projection protruded toward the remaining one of the adjustable kneading member and the support bracket, in which is provided a guide slit guiding the adjustable kneading member, wherein the guide projection is slidably inserted into the guide slit.

According to an aspect, the main body comprises: an oven frame with a first bracket defining an inside wall of the oven compartment, and side brackets defining opposing side walls of the oven compartment; and a main frame defining an oven accommodating part to accommodate the oven frame, and having a cover bracket covering a first side of the oven frame, and a first adjusting through hole located at a position corresponding to the adjusting screw hole of the adjusting screw supporter, enabling adjustment of the adjusting screw.

According to an aspect, the bread maker further comprises a first cover, covering a first side of the main frame to define an external appearance, and having a second adjusting through hole located at a position corresponding to the first adjusting through hole.

According to an aspect, the support bracket is bent in the first direction from an upper end of the first bracket of the oven frame.

BRIEF DESCRIPTION OF THE DRAWINGS

These and/or other aspects and advantages of the present invention will become apparent and more readily appreciated from the following description of the embodiments, taken in conjunction with the accompany drawings, of which:

FIG. 3 is a schematic sectional view of the bread maker of FIG. 1.

DETAILED DESCRIPTION

Figure 1:
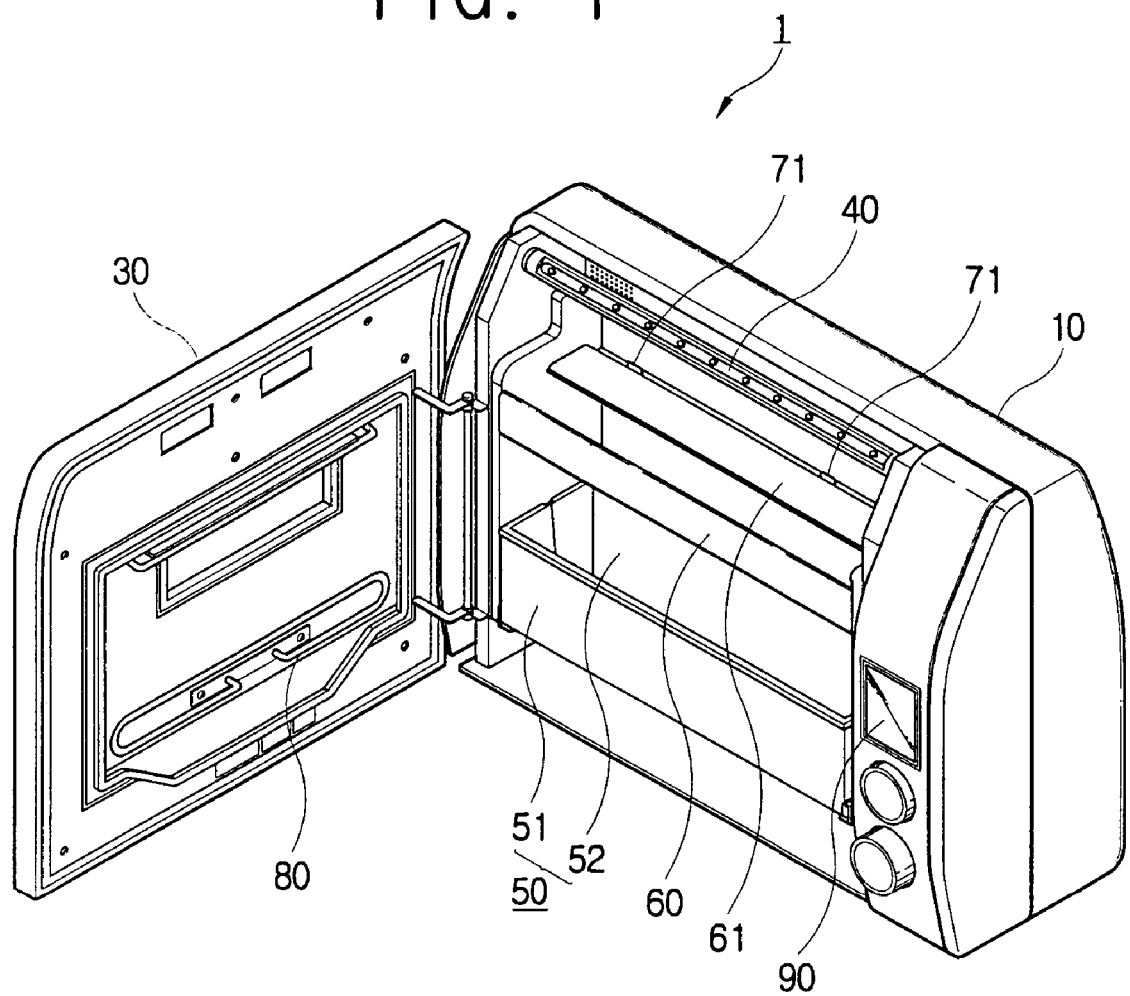
FIG. 1 is a perspective view of a bread maker according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

As shown in FIG. 1, a bread maker 1 according to an embodiment of the present invention comprises a main body 10 with an oven compartment and a component compartment, a door 30 provided in a front of the main body 10 to open and close a front opening of the oven compartment, and an operation display panel 90 provided in one side of the front of the main body 10 to display the operating status of the bread maker.

Inside the oven compartment, upper and lower kneading drums 40 and 41 are provided in parallel (refer to FIG. 3), being spaced from each other by a predetermined distance, and are rotated clockwise and counterclockwise. Opposite ends of a mixing bag 2 filled with raw materials (ingredients) 3 for bread are wound on the upper and lower kneading drums 40 and 41. Thus, the mixing bag 2 moves up and down according to the clockwise and counterclockwise rotation of the upper and lower kneading drums 40 and 41.

In a lower side of the oven compartment between the upper and lower kneading drums 40 and 41, a baking tray 50, which accommodates the raw materials 3 once they are completely kneaded, is provided. The baking tray 50 has first and second trays 51 and 52 having nearly "L"-shaped cross-sections symmetrically disposed in the lower side of the oven compartment. The first and second trays 51 and 52 combine to define a box with a top thereof being open. Also, a first slit 53, through which the mixing bag 2 passes, is positioned between the first and second trays 51 and 52 (see FIG. 3).

Heaters 80 heating the oven compartment are provided at upper and lower parts of an inside wall of the oven compartment, and on a surface of the door 3 toward the oven compartment. According to one aspect, a barcode scanner (not shown) to read a barcode attached to the mixing bag 2 is provided in the rear of the upper kneading drum 40 provided in the upper part of the oven compartment.

The component compartment is provided beside the oven compartment. A drum driving part (not shown), which rotates the upper and lower kneading drums 40 and 41 clockwise and counterclockwise, is provided in the component compartment. According to one aspect, the drum driving part includes a motor (not shown) rotating the lower kneading drum 41, and a belt (not shown) linking the upper and lower kneading drums 40 and 41, so that the upper kneading drum 40 corotates clockwise and counterclockwise with the lower kneading drum 41.

Figure 2:
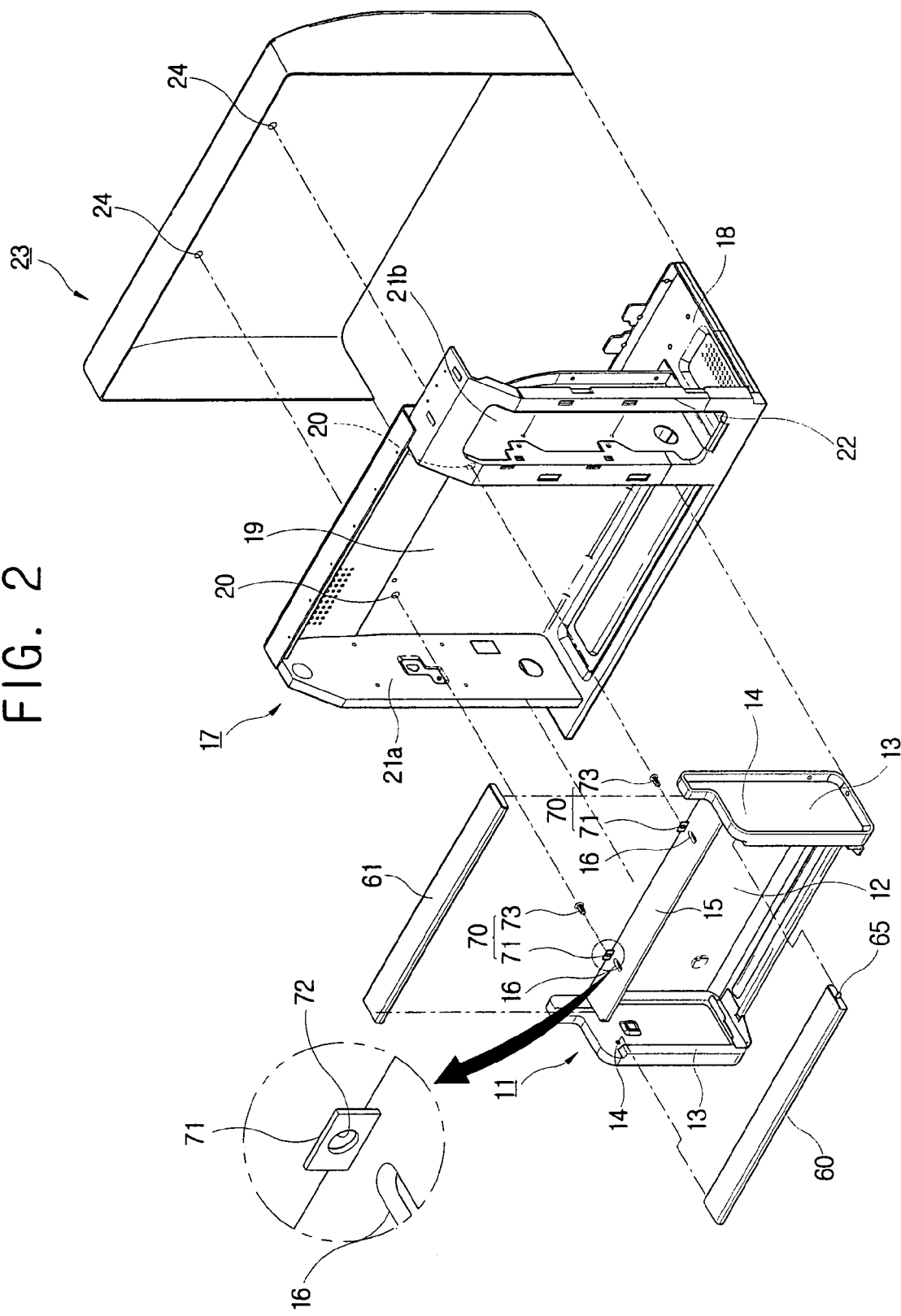
FIG. 2 is an exploded perspective view of a main body of the bread maker of FIG. 1.

As shown in FIG. 2, the main body 10 comprises an oven frame 11 framing the oven compartment, a main frame 17 framing an oven accommodating part to accommodate the oven frame 11, and a rear cover 23 connected to a rear of the main frame 17 to define a rear appearance.

The oven frame 11 has a front opening, and comprises a rear bracket 12 defining the inside wall of the oven compartment, and a pair of side brackets 13 defining opposing sidewalls of the oven compartment. In the oven frame 11, is provided a support bracket 15, which protrudes frontward from an upper end of the rear bracket 12, and supports an adjustable kneading member 61 (to be described later). According to one aspect, the support bracket 15 is provided as one body with the rear bracket 12, being bent frontward from the upper end of the rear bracket 12. According to another aspect, the support bracket 15 is provided by engaging a plate-shape frame onto an upper part of the rear bracket 12.

The main frame 17 comprises a base plate 18, a cover bracket 19 covering a rear of the oven frame 11, a pair of side walls 21a and 21b engaged with the cover bracket 19 and defining the oven accommodating part, and a component compartment cover 22 provided frontward of a space defining the component compartment. According to one aspect, the second sidewall 21b, which separates the oven accommodating part and the component compartment, is provided as one body with the component compartment cover 22.

As shown in FIGS. 1 through 3, the bread maker 1 comprises: a pair of kneading members 60 and 61 facing each other so that a second slit 64, through which the mixing bag 2 passes, is positioned in the upper part of the baking tray 50 between the upper and lower kneading drums 40 and 41; and a slit adjusting part 70 so that the second slit 64 can be adjusted.

The kneading members 60 and 61 knead the raw materials 3 in the mixing bag 2, and prevent the kneaded raw materials 3 from moving from the mixing bag 2 to the upper kneading drum 40. In opposite sides of both kneading members 60 and 61, kneading profile members 62 and 63 are respectively engaged to both kneading members 60 and 61.

The kneading members 60 and 61 respectively comprise a rotatable kneading member 60, and an adjustable kneading member 61, which is adjustably separated from the rotatable kneading member 60 by the slit adjusting part 70 in the oven compartment. The adjustable kneading member 61 is provided in the oven compartment, and the rotatable kneading member 60 is provided opposite to the adjustable kneading member 61, so that the second slit 64 through which the mixing bag 2 passes is positioned at a front of the adjustable kneading member 61.

Opposite ends of the rotatable kneading member 60 are rotatably provided in both sidewalls, that is, both side brackets 13 of the oven frame 11. Support shafts 65 that protrude toward the side brackets 13 of the oven frame 11 are provided in the opposite ends of the rotatable kneading member 60, and support shaft accommodating holes 14, into which the support shafts 65 are rotatably inserted, are positioned in the side brackets 13 of the oven frame 11.

The adjustable kneading member 61 is provided in the support bracket 15 protruded frontward from the inside wall of the oven compartment. In a plate facing the supporting bracket 15 of adjustable kneading member 61, guide projections 66 protruded toward the support bracket 15 are provided. Guide slits 16 guiding the adjustable kneading member 61 so that the adjustable kneading member 61 can be adjusted, are provided in the support bracket 15. The guide projections 66 are slidably inserted into the guide slits 16. Accordingly, the adjustable kneading member 61 approaches and retreats from the rotatable kneading member 60.

The slit adjusting part 70 comprises adjusting screw supporter 71 protruded upward from the supporting bracket 15, with an adjusting screw hole 72, and an adjusting screw 73, which is engaged to the adjusting screw hole 72, and adjusts the adjustable kneading member 61.

According to one aspect, one or more adjusting screw supporters 71 are provided in the supporting bracket 15 along the lengthwise direction of the supporting bracket 15. In the present embodiment, two adjusting screw supporters 71 are respectively provided on lengthwise opposite sides of the supporting bracket 15. Also, according to one aspect, the adjusting screw holes 72 are threaded (not shown) to engage the adjusting screws 73.

The adjusting screws 73 are engaged to the adjusting screw holes 72 so that a partially threaded end of each adjusting screw 73 passes through the corresponding adjusting screw hole 72 and contacts with a rear side of the adjustable kneading member 61. If the adjusting screws 73 are rotated in a fastening direction to the adjusting screw holes 72, end parts of the adjusting screws 73 press the adjustable kneading member 61 and adjust the adjustable kneading member 61 toward the rotatable kneading member 60. If the adjusting screws 73 are rotated in a loosening direction from the adjusting screw holes 72, the adjusting screws 73 are spaced from the adjustable kneading member 61, so that the adjustable kneading member 61 is spaced from the rotatable kneading member 60.

According to one aspect, rotating the adjusting screws 73 in the loosening direction adjusts the adjustable kneading member 61 toward the rotatable kneading member 60, and rotating the adjusting screws 73 in the fastening direction adjusts the adjustable kneading member 61 away from the rotatable kneading member 60.

When the end parts of the adjusting screws 73 are spaced from the adjustable kneading member 61 and thus the adjustable kneading member 61 is spaced from the rotatable kneading member 60, the raw materials 3 in the mixing bag 2 are caught between both kneading members 60 and 61, and thus press the adjustable kneading member 61 in a direction spaced from the rotatable kneading member 60, to thereby adjust the second slit 64 positioned between the kneading members 60 and 61. That is, the slit adjusting part 70 sets up an uppermost limit of the second slit 64 positioned between the kneading members 60 and 61.

In the cover bracket 19 of the main frame 17 of the bread maker 1, first adjusting through holes 20, through which an adjusting unit to adjust the adjusting screws 73, such as a screw driver, passes, are located at positions corresponding to the adjusting screw holes 72. In a rear cover 23, second adjusting through holes 24, through which the adjusting unit passes, are located at positions corresponding to the first adjusting through holes 20. Thus, even when the bread maker 1 is completely assembled, the adjusting screw 73 can be adjusted through the second adjusting through hole 24 of the rear cover 23 and the first adjusting through hole 20 of the cover bracket 19, by using the adjusting unit.

With the above configuration, when the bread maker 1 starts operating, a controller (not shown) at first rotates the upper and lower kneading drums 40 and 41 clockwise and counterclockwise, and performs a kneading process. As the mixing bag 2 moves up and down, the raw materials 3 in the mixing bag 2 are kneaded. That is, when the mixing bag 2 moves up by the rotation of both kneading drums 40 and 41 through the second slit 64 between the rotatable kneading member 60 and the adjustable kneading member 61, only the mixing bag 2 moves toward the upper kneading drum 40. In other words, the raw materials 3 in the mixing bag 2 do not pass through the second slit 64, and are kneaded under the rotatable kneading member 60 and the adjustable kneading member 61. Similarly, when the mixing bag 2 moves down, through the first slit 53 in the baking tray 50, the raw materials 3 are also kneaded. Through this process, the upper and lower kneading drums 40 and 41 alternately rotate clockwise and counterclockwise, to knead the raw materials 3.

When the kneading process is completed, the mixing bag 2 is automatically removed from the upper kneading drum 40 and wound onto the lower kneading drum 41. As a top end of the mixing bag 2 is drawn through the first slit 53, the kneaded raw materials 3 are expressed into baking tray 50. Thus, only completely knead raw materials exist in the baking tray 50. Bread is made in the baking tray 50 by leavening and baking the kneaded materials for a predetermined time by the heating operation of the heater 80.

As described above, the second slit 64 is positioned between the kneading drums 40 and 41 and allows the mixing bag 2 to pass through, and the slit adjusting part 70 allows the kneading members to approach and retreat from each other, so that the second slit 64 is adjusted.

As described above, the present invention provides, a bread maker allowing smooth kneading and operation with an adjustable slit positioned between opposing kneading members.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A bread maker, comprising:
   a main body defining an oven compartment;
   a pair of kneading drums rotatably provided inside the oven compartment, spaced apart from each other, each kneading drum holding opposite ends of a mixing bag and being rotated;
   a pair of kneading members oppositely provided between the pair of kneading drums, spaced apart and defining a slit therebetween to allow the mixing bag to pass therethrough, the pair of kneading members comprising
      a rotatable kneading member rotatably provided in the oven compartment, and
      an adjustable kneading member provided to approach and retreat from the rotatable kneading member by operation of the slit adjusting part;
   a slit adjusting part adjusting the pair of kneading members to adjust the slit; and
   a support bracket protruded in a first direction from an inside wall of the oven compartment, and supporting the adjustable kneading member,
   wherein the slit adjusting part has an adjusting screw supporter with an adjusting screw hole, protruded from the supporting bracket, and an adjusting screw engaged to the adjusting screw hole and causing the adjustable kneading member to approach and retreat from the rotatable kneading member.

2. The bread maker according to claim 1, wherein in one of the adjustable kneading member and the support bracket, there is provided a guide projection protruded toward the remaining one of the adjustable kneading member and the support bracket, in which is provided a guide slit guiding the adjustable kneading member,
   wherein the guide projection is slidably inserted into the guide slit.

3. The bread maker according to claim 2, wherein the main body comprises:
   an oven frame having a first bracket defining an inside wall of the oven compartment, and side brackets defining opposing side walls of the oven compartment; and
   a main frame defining an oven accommodating part to accommodate the oven frame, and having a cover bracket covering a first side of the oven frame, and a first adjusting through hole located at a position corresponding to the adjusting screw hole of the adjusting screw supporter to pass an adjusting unit therethrough, adjusting] to enable adjustment of the adjusting screw.

4. The bread maker according to claim 3, further comprising a first cover, covering a first side of the main frame to define an external appearance, and having a second adjusting through hole located at a position corresponding to the first adjusting through hole.

5. The bread maker according to claim 3, wherein: the supporting bracket is bent in the first direction from an upper end of the first bracket of the oven frame.

6. A bread maker, comprising:
an oven compartment;
a pair of kneading drums rotatably provided in the oven compartment, and holding opposite ends of a mixing bag;
a pair of kneading members oppositely provided between the pair of kneading drums, and defining an adjustable first slit therebetween, through which the mixing bag passes, the pair of kneading members comprising
a rotatable kneading member, and
an adjustable kneading member that is adjusted toward and away from the rotatable kneading member to adjust the first slit; and
a door;
an oven frame framing the oven compartment;
an oven accommodating part to accommodate the oven frame;
a main frame framing the oven accommodating part; and
a first cover connected to a first side of the main frame, and defining an external appearance of the bread maker,
wherein the oven frame comprises
a first bracket defining a first wall of the oven compartment,
a pair of side brackets defining opposing sidewalls of the oven compartment, and a support bracket supporting the adjustable kneading member.

7. The bread maker according to claim 6, wherein:
rotation of the pair kneading drums draws the mixing bag toward one of the pair of kneading drums, and opposite rotation of the pair of kneading drums draws the mixing bag toward the remaining one of the pair of kneading drums.

8. The bread maker according to claim 6, wherein:
the support bracket is an integrated unit with the first bracket.

9. The bread maker according to claim 6, wherein:
the support bracket is a plate-shaped frame engaged to the first bracket.

10. The bread maker according to claim 6, wherein the main frame comprises:
a cover bracket covering a first side of the oven frame;
a pair of sidewalls engaged with the cover bracket and defining the oven accommodating part; and
a component cover defining a component compartment.

11. The bread maker according to claim 6, further comprising:
a slit adjusting part adjusting the first slit.

12. The bread maker according to claim 11, wherein:
the slit adjusting part adjusts the adjustable kneading member toward and away from the rotatable kneading member to adjust the first slit.

13. The bread maker according to claim 12, further comprising:
a support bracket supporting the adjustable kneading member.

14. The bread maker according to claim 11, wherein:
the slit adjusting part sets an uppermost limit of the first slit.

15. A bread maker, comprising:
an oven compartment;
a pair of kneading drums rotatably provided in the oven compartment, and holding opposite ends of a mixing bag;
a pair of kneading members oppositely provided between the pair of kneading drums, and defining an adjustable first slit therebetween, through which the mixing bag passes, the pair of kneading members comprising
a rotatable kneading member, and
an adjustable kneading member that is adjusted toward and away from the rotatable kneading member to adjust the first slit;
a door;
an oven frame framing the oven compartment;
an oven accommodating part to accommodate the oven frame;
a main frame framing the oven accommodating, the main frame comprising
a cover bracket covering a first side of the oven frame,
a pair of sidewalls engaged with the cover bracket and defining the oven accommodating part, and
a component cover defining a component compartment; and
a first cover connected to a first side of the main frame, and defining an external appearance of the bread maker,
wherein one of the pair of sidewalls separates the oven accommodating part and the component compartment and is an integrated unit with the component compartment cover.

16. A bread maker, comprising:
an oven compartment;
a pair of kneading drums rotatably provided in the oven compartment, and holding opposite ends of a mixing bag;
a pair of kneading members oppositely provided between the pair of kneading drums, and defining an adjustable first slit therebetween, through which the mixing bag passes, the pair of kneading members comprising
a rotatable kneading member, and
an adjustable kneading member that is adjusted toward and away from the rotatable kneading member to adjust the first slit;
a slit adjusting Part adjusting the first slit, the slit adjusting part adjusting the adjustable kneading member toward and away from the rotatable kneading member to adjust the first slit; and
a support bracket supporting the adjustable kneading member,
wherein the slit adjusting part comprises
an adjusting screw supporter provided on the support bracket; and
an adjusting screw that engages the adjusting screw supporter and adjusts the adjustable kneading member toward and away from the rotatable kneading member to adjust the first slit.

17. The bread maker according to claim 16, wherein:
the adjusting screw supporter has a threaded hole to engage the adjusting screw.

18. The bread maker according to claim 16, wherein:
one of the adjustable kneading member and the support bracket comprises a guide slit; and
the remaining one of the adjustable kneading member and the support bracket comprises a guide projection projecting toward the one of the adjustable kneading member and the support bracket, wherein the guide projection is slidably inserted into the guide slit, and the guide slit guides movement of the kneading member toward and away from the rotatable kneading member to adjust the first slit.

19. The bread maker according to claim 16, wherein:

an exterior of the bread maker has an adjusting through hole, through which an adjusting unit is inserted to adjust the adjusting screw after the bread maker is assembled.

20. A bread maker, comprising:

an oven compartment;

a pair of kneading drums rotatably provided in the oven compartment, and holding opposite ends of a mixing bag;

a pair of kneading members oppositely provided between the pair of kneading drums, and defining an adjustable first slit therebetween, through which the mixing bag passes, the pair of kneading members comprising a rotatable kneading member, and an adjustable kneading member that is adjusted toward and away from the rotatable kneading member to adjust the first slit; and an oven frame framing the oven compartment, the oven frame comprising a first bracket defining a first wall of the oven compartment, a pair of side brackets defining opposing sidewalls of the oven compartment, and a support bracket supporting the adjustable kneading member.

* * * * *

UNITED STATES PATENT AND TRADEMARK OFFICE
CERTIFICATE OF CORRECTION

| | | |
|---|---|---|
| PATENT NO. | : 7,171,891 B2 | Page 1 of 1 |
| APPLICATION NO. | : 10/776234 | |
| DATED | : February 6, 2007 | |
| INVENTOR(S) | : Jae-ryong Park et al. | |

It is certified that error appears in the above-identified patent and that said Letters Patent is hereby corrected as shown below:

Column 7, Line 2, change "adjusting]" to --adjusting--.

Column 8, Line 47, change "Part" to --part--.

Signed and Sealed this

First Day of May, 2007

JON W. DUDAS
*Director of the United States Patent and Trademark Office*